United States Patent [19]

Wright

[11] Patent Number: 4,640,671

[45] Date of Patent: Feb. 3, 1987

[54] ADOBE BLOCK PRESS

[76] Inventor: John W. Wright, P.O. Box 7397, Grants, N. Mex. 87020

[21] Appl. No.: 804,860

[22] Filed: Dec. 5, 1985

[51] Int. Cl.[4] ............................................. B28B 17/00
[52] U.S. Cl. ................................... 425/149; 425/167; 425/177; 425/351; 425/361; 425/416; 425/422; 425/444; 425/466; 425/467
[58] Field of Search .................... 425/62, 73, 149, 167, 425/177, 350, 351, 361, 406, 416, 422, 423, 434, 444, 466, 467

[56] References Cited

U.S. PATENT DOCUMENTS

| | | |
|---|---|---|
| 266,532 | 10/1882 | Ross . |
| 435,171 | 8/1890 | Davis et al. . |
| 686,656 | 11/1901 | Hoban . |
| 836,547 | 11/1906 | Walsh . |
| 2,367,242 | 1/1945 | Stacy . |
| 2,560,980 | 7/1951 | Petterson . |
| 3,956,516 | 5/1976 | Holt et al. . |
| 4,439,129 | 3/1984 | Long et al. . |
| 4,557,681 | 12/1985 | Wright et al. . |

Primary Examiner—Bernard Nozick
Attorney, Agent, or Firm—Harvey B. Jacobson

[57] ABSTRACT

A three station turret-type apparatus is provided with a first station including structure for receiving a quantity of soil to be compressed into a building block, a second station for compressing the soil into the desired building block and a third station for ejecting a formed building block from the apparatus. A rotary table is equipped with peripherally spaced sleeves for successive registry with the three station positions and each sleeve comprises a mold in which the desired block is to be formed. The sleeves are removable and replaceable and one form of sleeve is constructed to have an auxiliary smaller plan area sleeve removably mounted therein. Further in the second station position, a stationary bottom plate closes the lower end of the sleeve registered therewith and the bottom plate faced with a urethane elastomer material. A pressure head opposes and is movably toward and away from the stationary plate and is faced with a similar urethane elastomer material.

9 Claims, 12 Drawing Figures

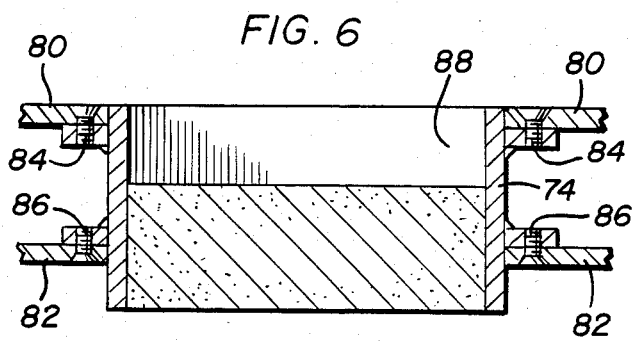
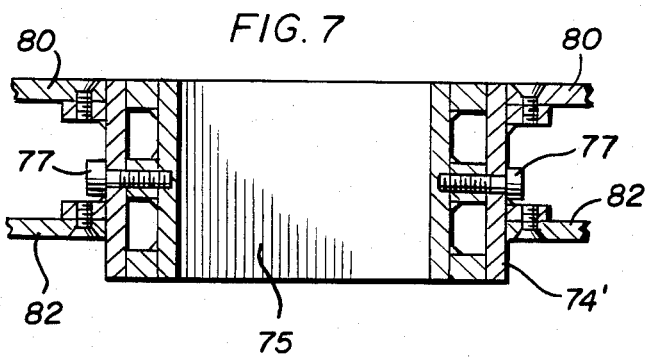
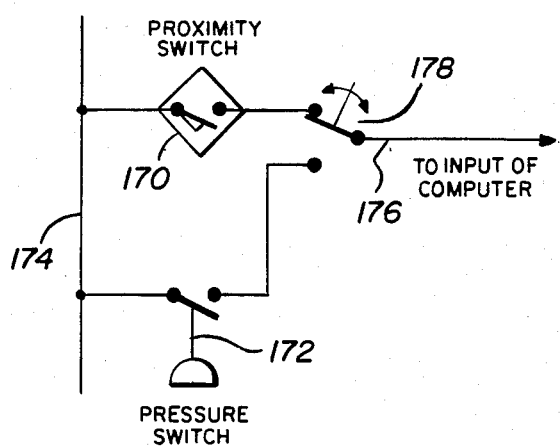
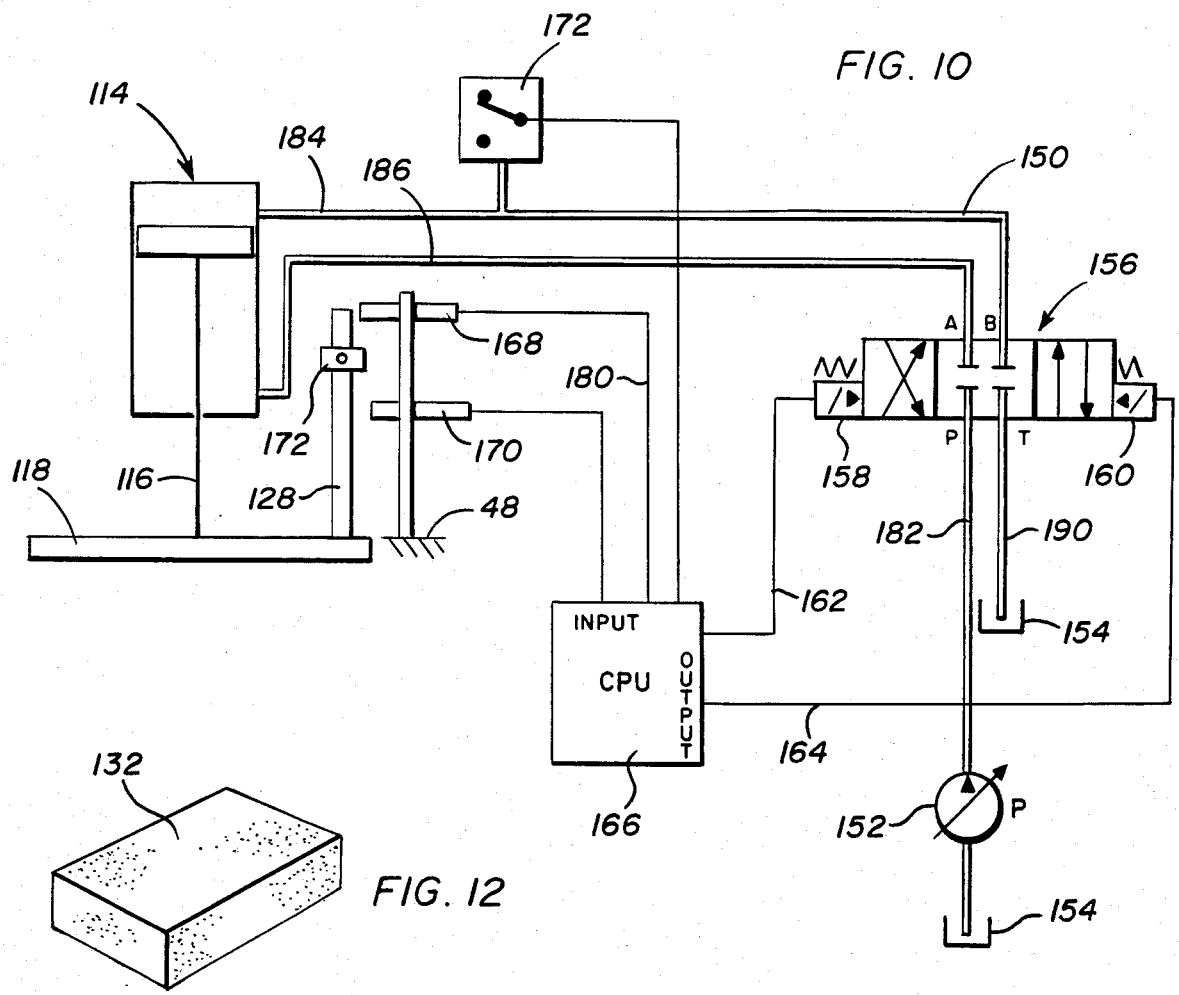

ADOBE BLOCK PRESS

CROSS-REFERENCE TO RELATED APPLICATIONS

This application discloses an improved form of an adobe block press disclosed in the U.S. application of John W. Wright et al, Ser. No. 368,443, filed Apr. 14, 1982 now U.S. Pat. No. 4,557,681, for Apparatus for Forming Adobe Blocks.

BACKGROUND OF THE INVENTION

1. Field of the Invention

This invention relates to a turret-type rotary table apparatus for compressing soil into adobe blocks, as classified in Class 425, Subclasses 62 and 361.

2. Description of Related Art

Various different forms of apparatuses including some of the general structural and operational features of the instant invention are disclosed in U.S. Pat. Nos. 266,532, 435,171, 686,656, 836,547, 2,560,980, 3,225,409 and 3,956,516. However, these previously known apparatuses are not specifically designed to provide means by which the plan size of the blocks to be formed may be varied, the press components between which the blocks are formed are constructed to effect a ready release of the blocks after forming and the blocks to be formed may be pressed to a predetermined thickness or, selectively, to a predetermined density. Accordingly, a need exists for an adobe block forming apparatus which includes features thereof enabling different plan size blocks to be formed, ready release of the blocks after forming and a selection in operation whereby the blocks being formed may be pressed to a given thickness or to a given density.

SUMMARY OF THE INVENTION

The apparatus of the instant invention is constructed on a mobile trailer chassis whereby it may be readily transported to a point of use and in particular to a point immediately adjacent the building site.

The apparatus is further constructed whereby high volume production of adobe blocks may be readily achieved and the quality of adobe blocks produced by the apparatus is considerably greater than that which is required in the construction of adobe buildings in substantially all locations in which adobe buildings are presently constructed.

The apparatus is capable of generating pressure sufficiently great to enable high quality adobe building blocks to be formed of heavy textured clay soil in the condition it is dug from the ground and without the addition of any moisture or binder materials. Further, the adobe blocks produced by the apparatus of the instant invention need not be air-dried before usage and thus immediately may be placed in a building wall upon being discharged from the apparatus in which they are formed. Still further, when constructing an adobe wall utilizing the blocks produced by the apparatus of the instant invention, the upper surface of each course of adobe blocks may be dampened before the next course of adobe blocks is placed thereover. In this manner, the smooth and planar upper and lower surfaces of the adobe blocks may bind tightly together merely through the utilization of the moisture applied only to the upper surfaces of the blocks of each course of blocks.

The apparatus of the instant invention is further unique in that it is constructed in a manner enabling the plan size and shape of the blocks being formed by the apparatus to be changed and is further constructed in a manner whereby the adobe blocks, after being formed by the apparatus, are readily releasable from the surfaces of the apparatus between which the blocks are pressed. Still further, the apparatus is constructed in a manner such that the blocks may be pressed to a desired thickness or to a desired density.

The main object of this invention is to provide an apparatus for forming adobe blocks which will greatly reduce the manhours of labor required to produce one thousand blocks.

Another object of this invention is to provide an apparatus which will be capable of forming adobe blocks of high quality at high volume rates.

Yet another object of this invention is to provide an apparatus for forming adobe blocks which may utilize heavy textured clay soil as the material for the adobe blocks being formed and without mixing a binder material with the soil and merely supplying fresh dug heavy textured clay soil directly to the apparatus.

A still further object of this invention is to provide an apparatus which will be capable of forming adobe blocks in high quantities and with the blocks formed by the apparatus being immediately usable in a building wall without any "drying time".

Yet another important object of this invention is to provide an apparatus in accordance with the preceding objects and which is capable of varying the plan size and shape of the adobe blocks being formed.

A further object of this invention is to provide an adobe block press constructed in a manner whereby the adobe blocks formed by the press may be readily released from the surfaces of the apparatus between which the adobe blocks are formed after formation of the blocks.

Still another object of this invention is to provide an adobe block forming apparatus constructed in a manner whereby adobe blocks formed thereby may be pressed to a predetermined thickness or to a predetermined density.

A final object of this invention to be specifically enumerated herein is to provide an apparatus for forming adobe building blocks and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a fragmentary vertical sectional view illustrating the mold cavity for forming a full size adobe block;

FIG. 7 is a fragmentary vertical sectional view illustrating the mold cavity having an insert mounted therein for forming a smaller size adobe block;

FIG. 10 is a diagrammatic view of the hydraulic and electrical control circuit of the block press;

FIG. 11 is a fragmentary diagrammatic view illustrating the manner in which the hydraulic ram of the press may be controlled either by achieved block thickness or achieved press force; and FIG. 12 is a perspective view of a typical adobe block which may be formed through the utilization of the press of the instant invention.

DESCRIPTION OF THE PREFERRED EMBODIMENT

Figure 1:
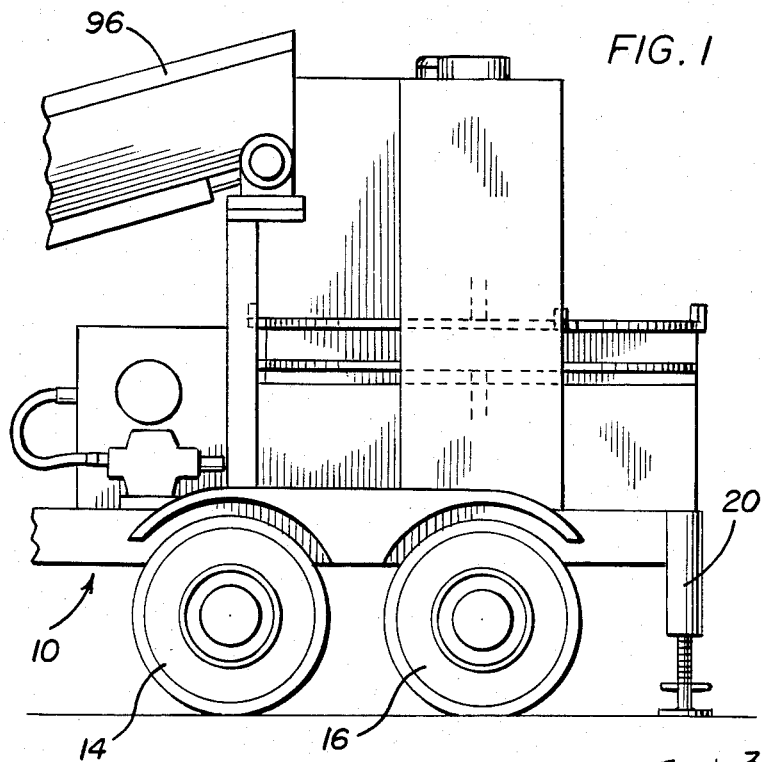
FIG. 1 is a fragmentary left-hand elevational view of the rear portion of a trailer upon which the adobe block press of the instant invention is mounted.
Figure 5:
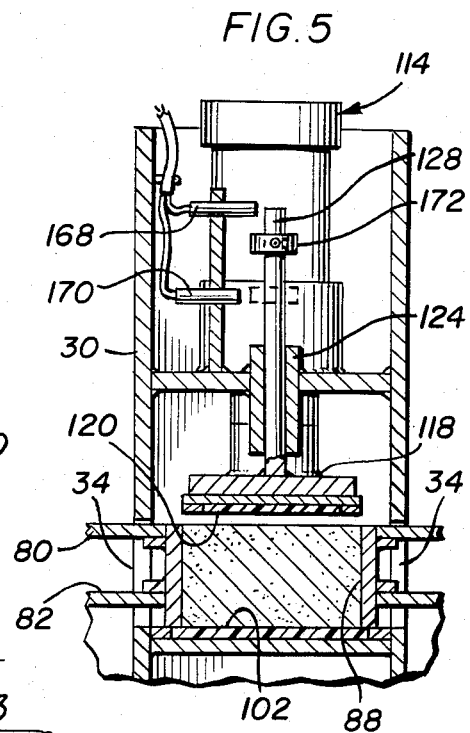
FIG. 5 is a fragmentary vertical sectional view taken substantially upon the plane indicated by the section line 5—5 of FIG. 3.

Referring now more specifically to the drawings, the numeral 10 generally designates a trailer frame which may be towed behind a towing vehicle (not shown) and which includes a pair of wheeled axle assemblies 14 and 16 (tandem) on its rear end as well as a pair of opposite side rear jack structures 20. The jack structures 20 may be utilized in conjunction with a central forward jack structure (not shown) in order to stationarily support the trailer frame 10 from the ground.

The frame supports a pair of opposite side upstanding plates 24 and 26 therefrom and the plates 24 and 26 are interconnected through the utilization of a pair of front and rear upstanding plates 28 and 30 extending and secured therebetween. In addition, a journal bearing support structure referred to in general by the reference numeral 32 extends between the plates 28 and 30 below front to rear extending openings 34 formed in the plates 28 and 30 and the support structure 32 includes a lower plate 36 extending and secured between the plates 28 and 30, a pair of laterally spaced and transversely extending front and rear channel members 38 and 40 secured to the plate 36 and extending and secured to the plates 28 and 30 and a pair of connecting plates 42 and 44 resting upon the lower plate 36 and extending between the channel members 38 and 40, a upstanding sleeve bearing 46 being snugly received and removably secured between the connecting plates 42 and 44 and the channel members 38 and 40.

An upper plate 48 extends between and is secured to the plates 24, 26, 28 and 30 and has a central opening 50 formed therein through which an upper shaft 52 is received. The shaft 52 is journalled from a journal 54 mounted on the underside of the plate 48 and the lower end of the shaft 52 is mounted upon an upper plate 56. A lower plate 58 is provided spaced below and in vertical alignment with the upper plate 56 and a lower shaft 60 depends downwardly from the lower plate 58 and is rotatably journalled in the sleeve bearing 46, the plate 36 having a positioning bolt 62 threaded therethrough and including an upper end with which the lower end of the lower shaft 60 is downwardly abutted, the bolt 62 thereby determining the elevation of plates 56 and 58 which are interconnected in a manner to be hereinafter more fully set forth. The upper end of the upper shaft 52 has a sprocket wheel 64 mounted thereon and a motor 66 including a rotary output shaft 68 is mounted from the plate 28. A sprocket wheel 70 is mounted on the output shaft 68 and an endless chain 72 is trained about the sprocket wheels 64 and 70.

Figure 2:
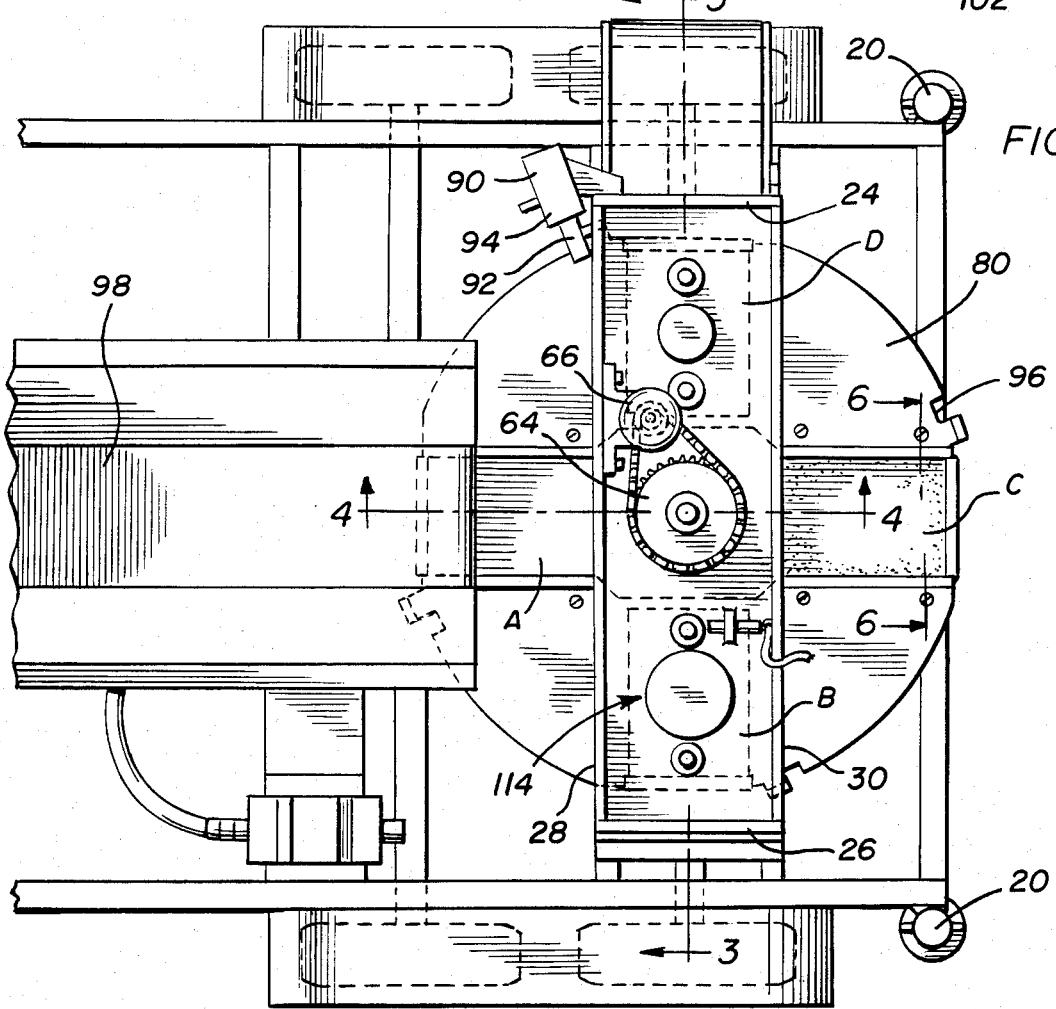
FIG. 2 is an enlarged fragmentary top plan view of the assemblage illustrated in FIG. 1.
Figure 3:
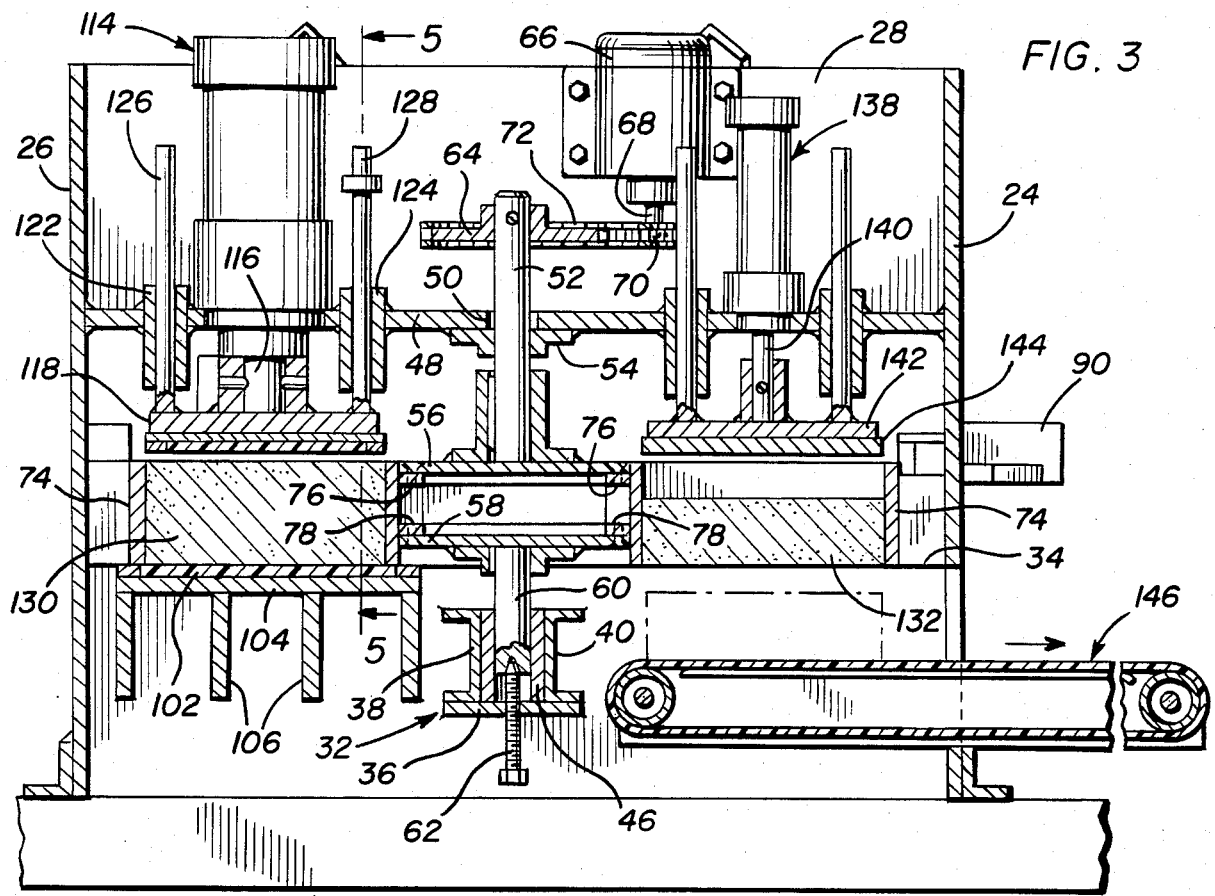
FIG. 3 is an enlarged fragmentary vertical sectional view taken substantially upon the plane indicated by the section line 3—3 of FIG. 2.
Figure 4:
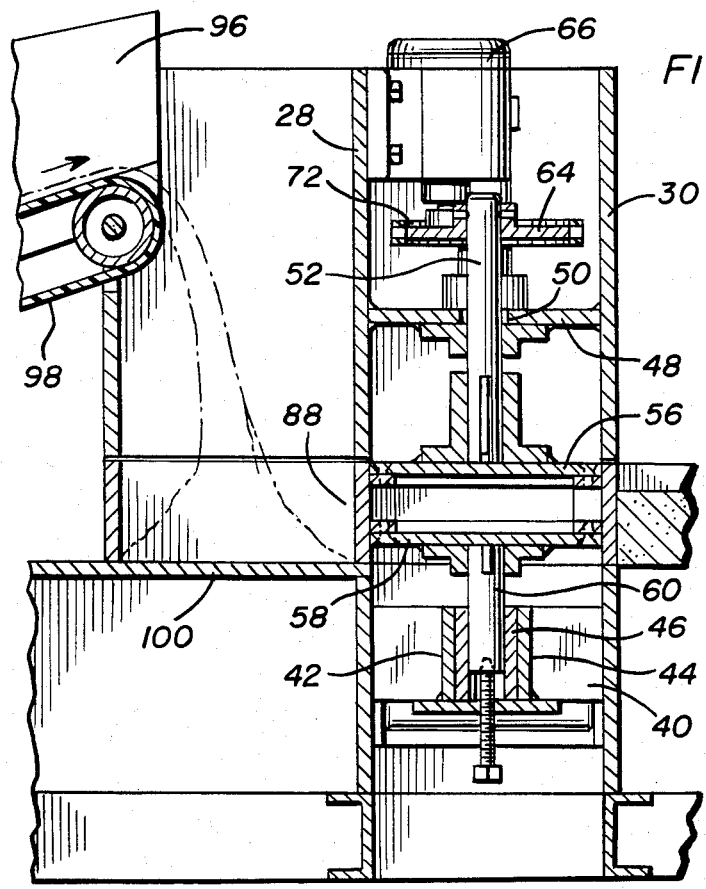
FIG. 4 is an enlarged fragmentary vertical sectional view taken substantially upon the plane indicated by the section line 4—4 of FIG. 2.
Figure 8:
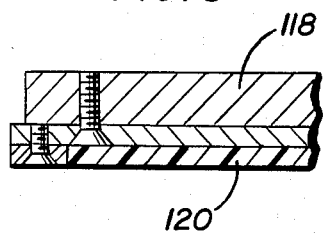
FIG. 8 is an enlarged fragmentary vertical sectional view illustrating the manner in which the pressure head of the press is provided with a replaceable elastomeric pressure surface forming panel.
Figure 9:
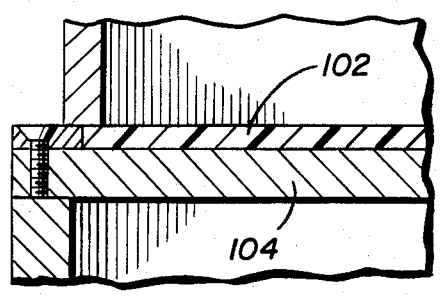
FIG. 9 is a fragmentary vertical sectional view illustrating the manner in which the anvil plate of the press is provided with a replaceable elastomeric pressure surface forming panel.

The plates 56 and 58 are generally square and are secured to the inner marginal edges of four mold chamber defining sleeves 74 as at 76 and 78, see FIG. 3, and four upper sector plates and four lower sector plates 82 are secured between adjacent sides of adjacent sleeves 74 as at 84 and 86, see FIGS. 2 and 6. Each of the sleeves 74 defines a mold chamber 88 which is generally rectangular in plan shape and the plate 24 mounts a latch assembly 90 therefrom including a spring extendible latch pin 92 and a hydraulic cylinder 94 for hydraulically retracting the pin 92. The pin 92 is receivable in any of the notches 96 formed in the plates 80 for indexing the turntable assembly comprising the plates 56, 58, the shafts 52 and 60, the sleeves 74 and the plates 80 and 82 in proper indexed positions, as will be hereinafter more fully set forth.

A soil receiving hopper 96 incorporating an endless conveyor 98 in the bottom thereof is provided and the conveyor 98 is operative to discharge soil from the upper end of the hopper 96 onto a stationary horizontal plate 100 over which the sleeves 74 are successively positionable to define a chamber 88 into which soil discharged from the endless conveyor 98 may be received. The plate 100 is disposed forward of the plate 28 and is horizontally registered with the upper surface of a resilient sheet 102 of urethane elastomer material backed by a heavy gauge backing plate 104 extending between the plates 28 and 30 and heavily reinforced from beneath as at 106. The plates 80 and 82 and the sleeves 74 are snugly swingable through the openings 34 and the upper surface of the sheet 102 is horizontally registered with the lower marginal portions of the openings 34.

The turntable is positionable in successive 90° rotated positions with a first position thereof aligned with the conveyor 98 comprising a soil receiving station A (see FIG. 2), a second compressing station B defined between one pair of corresponding ends of the plate 28 and 30, a third intermediate position C diametrically opposite position A and a fourth ejecting position D defined between the other pair of corresponding ends of the plates 28 and 30. The plate 48 mounts a high pressure ram assembly referred to in general by the reference numeral 114 over position B and the ram assembly 114 includes a downwardly extendible upwardly retractable rod 116 from which a pressure head 118 is supported, the head 118 having a sheet 120 corresponding to the sheet 102 removably mounted on the underside thereof. The plate 48 includes upstanding guides 122 and 124 secured therethrough and the head 118 includes upstanding rods 126 and 128 supported therefrom slidingly received through the guides 122 and 124. Upon actuation of the ram assembly 114, the quantity of soil 130 within the sleeve 74 at station B may be tightly compacted into a building block 132. The pressure exerted at station B is sufficient to cause the outer peripheral edges of the formed block 132 to tightly frictionally grip the inner surfaces of the corresponding sleeves 74 so that the block 132 will remain within the sleeve 74 as it is sequentially moved to station C and thereafter to station D.

At station D, a smaller hydraulic ram assembly 138 is mounted from the plate 48 and includes a downwardly extendible and upwardly retractable piston rod 140 having an ejection head 142 mounted on its lower end. The ejection head as a replaceable ejection plate 144 mounted to its underside and actuation of the hydraulic ram assembly 138 will cause the plate 144 to move downwardly through the sleeve 74 registered therewith and to eject the formed building block therefrom downwardly onto the discharge conveyor assembly conferred to in general by the reference numeral 146 disposed beneath station D.

With attention now invited more specifically to FIG. 7, there may be seen a modified form of sleeve 74' which may be substituted for the sleeve 74 and which may have a smaller sleeve 75 removably mounted therein through the utilization of threaded fasteners 77. Of course, if the smaller sleeve 75 is to be used in order to produce a building block of smaller dimensions than the building block 132, the head 118 and 142 as well as the sheet 120 and the panel 144 must be replaced by down-sized corresponding components.

With attention now invited more specifically to FIGS. 10 and 11, it may be seen that the hydraulic ram assembly 114 is serially connected within a hydraulic circuit 150 including a pump 152 for pumping hydraulic fluid from a reservoir 154, to the assembly 114 and then back to the reservoir 152. The hydraulic circuit 150 includes a valve assembly 156 serially connected therein and the valve assembly 156 is under the control of a pair of solenoids 158 and 160 actuated by output conductors 162 and 164, respectively, from a computer 166. A pair of proximity switches 168 and 170 are stationarily mounted relative to the plate 48 and a proximity switch actuator 172 is adjustably mounted on the rod 128. In addition, an adjustable pressure switch 172 is communicated with circuit 156 on the side thereof pressurized to downwardly extend the rod 116. The proximity switch 170 and pressure switch 172 are supplied current from a supply 174 and are connected to an input line 176 within the computer 166 through a selector switch 178 to an internal input terminal (not shown) of the terminal 176, the proximity swith 168 including its own output line 180 comprising an input to the computer 166. The switch 178 may be shifted between two positions connecting either the proximity switch 170 or the pressure switch 172 to the corresponding input terminal of the computer 166.

The valve 156, actuated by the computer output lines 162 and 164 is operable to connect the output line 182 from the pump 152 to either the input line 184 for downwardly extending the rod 116 or the line 186 for upwardly retracting the rod 116. Of course, if the output line 182 from the pump 152 is communicated with the line 186, the line 184 is communicated with the return line 190 to the reservoir 154. On the other hand, if the line 182 is communicated with the line 184, the line 186 is communicated with the line 190 for the reservoir 154.

Upon actuation of the computer, upon the assumption that the proper quantity of dirt 130 has been disposed in the chamber 88 vertically registered beneath the discharge end of the conveyor 98, the pump 152 provides hydraulic fluid under pressure to the line 184 through the valve 156 and the rod 116 of the ram assembly 114 is forced downwardly in order to compress the dirt 130 into a building block 132. If the switch 178 is in the position thereof illustrated in FIG. 11, as the head 118 moves downwardly to compress the soil 130 into a building block 132, the actuator 172 will move into close proximity with the switch 170 thereby actuating the computer 166 to actuate the valve 156 to terminate communication between the line 182 and the line 184 and to communicate the line 182 with the line 186 to cause upward retraction of the head 118. Of course, upward movement of the head 118 is limited under control of the proximity switch 186.

If, on the other hand, the switch 178 is in the alternate position thereof whereby the pressure switch 172 is connected to the input 176 of the computer 166, downwardly movement of the pressure head 118 as a result of hydraulic fluid under pressure being supplied to the line 184 from the line 182, through the valve 166 will be limited only when the pressure of fluid within the line 184 reaches the set pressure of the switch 172. When this predetermined pressure is reached, the input to the computer 166 from the switch 172 will cause the computer 166 to terminate communication between the line 182 and the line 184 and to communicate the line 182 with the line 186 through the valve 156 so as to thereby upwardly retract the head 118 responsive to a given maximum pressure generated by the ram assembly 114. Thus, when the proximity switch 170 is used to form a building block 132, all building blocks 132 are formed to the same adjusted thickness. On the other hand, the pressure switch 172 is utilized to limit downward movement of the head 118, all blocks will be compressed to the same density, but may vary slightly in thickness. Of course, there are various instances in which constant density of the blocks is more important than constant thickness blocks, and vice versa.

By utilizing the sheet 120 as well as the sheet 102, abrasive wear of the relatively movable surfaces between which the dirt 130 is compressed into a block 132 is substantially reduced. In addition, the resiliency of the sheet 120 allows for better release of the upper surface of the formed block 132 upon upward retraction of the head 118 and use of the sheet 102 enables a better release between the plate 104 and the formed block after the formed block is swung from position B to position D.

By utilizing individual sleeves 74 and indiviudal plates 80 and 82, individual working components of the apparatus may be readily renewed, if desired. Further, by utilizing the sleeves 74' in lieu of the sleeves 74, the size and shape of the building blocks 132 to be formed may be varied.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for forming building blocks from freshly dug soil, said apparatus including a frame, a rotary table journalled from said frame for intermittent angular displacement about an upstanding axis and defining at least three peripherally spaced open-ended vertically extending sleeve-type cavities spaced equally radially outwardly from said axis, said frame defining first soil receiving, second pressure head and third ejection head stations spaced about said axis and with which said cavities are successively registrable, said soil receiving station being adapted to receive freshly dug soil and opening downwardly for discharging soil therefrom into cavities of said table successively registered therewith, said pressure head station including downwardly facing pressure head means displaceable downwardly into a cavity of said table registered therewith for vertically compressing the soil therein and said ejection head station including a vertically shiftable ejection head for ejecting a compressed soil block from a cavity of said table registered therewith, said frame including horizontal plate means disposed at and extending along an arcuate path portion extending at the first and second stations and defining a bottom for said cavities disposed thereat as they move to said first and second stations, adjustment means operably connected between said frame dnd table for vertically shifting said table along said upstanding axis.

2. The apparatus of claim 1 wherein the portion of said plate means defining the bottom of a cavity registered with said second station includes an upper surface defining structure constructed of hard, but elastomeric material, said downwardly facing pressure head means defining an under surface also defined by a hard, but elastomeric material.

3. An apparatus for forming building blocks from freshly dug soil, said apparatus including a frame, a rotary table journalled from said frame for intermittent angular displacement about an upstanding axis and defining at least three peripherally spaced open-ended vertically extending sleeve-type cavities spaced equally radially outwardly from said axis, said frame defining first soil receiving, second pressure head and third ejection head stations spaced about said axis and with which said cavities are successively registrable, said soil receiving station being adapted to receive freshly dug soil and opening downwardly for discharging soil therefrom into cavities of said table successively registered therewith, said pressure head station including downwardly facing pressure head means displaceable downwardly into a cavity of said table registered therewith for vertically compressing the soil therein and said ejection head station including a vertically shiftable ejection head for ejecting a compressed soil block from a cavity of said table registered therewith, said frame including horizontal plate means disposed at and extending along an arcuate path portion extending at the first and second stations and defining a bottom for said cavities disposed thereat as they move to said first and second stations, motor means operatively connected between said frame and pressure head means for lowering and raising the latter, control means operatively connected to said motor means for adjustably limiting downward movement of said pressure head, said control means including selectively usable first and second actuators therefor, said first actuator including means operative to adjustably limit downward movement of said pressure head responsive to elevational positioning of said pressure head relative to said frame and said second actuator including means operative to adjustably limit downward movement of said head responsive to a predetermined maximum thrust applied to said pressure head by said motor means.

4. The apparatus of claim 3 wherein said motor means includes a hydraulic ram assembly.

5. The apparatus of claim 3 including control means operatively connected to said motor means for adjustably limiting downward movement of said pressure head.

6. An apparatus for forming building blocks from freshly dug soil, said apparatus including a frame, a rotary table journalled from said frame for intermittent angular displacement about an upstanding axis and defining at least three peripherally spaced open-ended vertically extending sleeve-type cavities spaced equally radially outwardly from said axis, said frame defining first soil receiving, second pressure head and third ejection head stations spaced about said axis and with which said cavities are successively registrable, said soil receiving station being adapted to receive freshly dug soil and opening downwardly for discharging soil therefrom into cavities of said table successively registered therewith, said pressure head station including downwardly facing pressure head means displaceable downwardly into a cavity of said table registered therewith for vertically compressing the soil therein and said ejection head station including a vertically shiftable ejection head for ejecting a compressed soil block from a cavity of said table registered therewith, said frame including horizontal plate means disposed at and extending along an arcuate path portion extending at the first and second stations and defining a bottom for said cavities disposed thereat as they move to said first and second stations, said rotary table including multi-sided upper and lower plates spaced along and generally centered relative to said axis, said cavities each comprising a vertical sleeve spaced outward from said axis and including a side adjacent the latter having its upper and lower portions removably anchored relative to adjacent sides of said upper and lower plates, said table also including a set of upper sector plates and a set of lower sector plates, said sets of plates each having a number of plates therein corresponding to the number of said sleeves, said upper sector plates extending between and being removably anchored to adjacent sides of adjacent sleeves outwardly of said multi-sided upper and lower plates.

7. The apparatus of claim 6 wherein said sleeves and sets of sector plates equal to four in number, each.

8. An apparatus for forming building blocks from freshly dug soil, said apparatus including a frame, a rotary table journalled from said frame for intermittent angular displacement about an upstanding axis and defining at least three peripherally spaced open-ended vertically extending sleeve-type cavities spaced equally radially outwardly from said axis, said frame defining first soil receiving, second pressure head and third ejection head stations spaced about said axis and with which said cavities are successively registrable, said soil receiving station being adapted to receive freshly dug soil and opening downwardly for discharging soil therefrom into cavities of said table successively registered therewith, said pressure head station including downwardly facing pressure head means displaceable downwardly into a cavity of said table registered therewith for vertically compressing the soil therein and said ejection head station including a vertically shiftable ejection head for ejecting a compressed soil block from a cavity of said table registered therewith, said frame including horizontal plate means disposed at and extending along an arcuate path portion extending at the first and second stations and defining a bottom for said cavities disposed thereat as they move to said first and second stations, said cavities each being defined by the interior of an upstanding sleeve removably supported from said table, a set of alternate sleeves equal in number to the number of the first mentioned sleeves, said alternate sleeves being of substantiall the same length as the first mentioned sleeves, but of smaller plan dimension and telescopingly receivable in the first mentioned sleeves, and means releasably operably connected between the first mentioned sleeves and said alternate sleeves removably stationarily mounting the latter within the first mentioned sleeves.

9. The apparatus of claim 8 wherein said sleeves and sets of sector plates equal to four in number, each.

* * * * *